United States Patent [19]
Wheaton

[11] Patent Number: 5,288,938
[45] Date of Patent: Feb. 22, 1994

[54] METHOD AND APPARATUS FOR CONTROLLING ELECTRONIC TONE GENERATION IN ACCORDANCE WITH A DETECTED TYPE OF PERFORMANCE GESTURE

[75] Inventor: James A. Wheaton, Fairfax, Calif.

[73] Assignee: Yamaha Corporation, Hamamatsu, Japan

[21] Appl. No.: 622,517

[22] Filed: Dec. 5, 1990

[51] Int. Cl.$^5$ ............................................. G10H 1/32
[52] U.S. Cl. ...................................... 84/600; 84/658; 84/723; 84/734; 84/742; 84/743
[58] Field of Search ............... 84/DIG. 12, 723-725, 84/730, 742-745, 603, 615, 626, 600, 658, 734; 382/1, 4, 8, 16, 25, 28

[56] References Cited

U.S. PATENT DOCUMENTS

| | | | |
|---|---|---|---|
| 4,490,851 | 12/1984 | Gerhart et al. | 382/28 X |
| 4,526,078 | 7/1985 | Chadabe | 84/615 X |
| 4,700,602 | 10/1987 | Bezzio | 84/DIG. 12 |
| 4,790,023 | 12/1988 | Matsui et al. | 382/8 |
| 4,852,443 | 8/1989 | Duncan et al. | 84/DIG. 12 |
| 4,963,035 | 10/1990 | McCarthy et al. | 382/28 |
| 4,968,877 | 11/1990 | McAvinney et al. | 250/221 |
| 4,980,519 | 12/1990 | Mathews | 84/733 X |
| 4,987,600 | 1/1991 | Rossum | 84/603 X |
| 5,192,826 | 3/1993 | Aoki | 84/743 X |

FOREIGN PATENT DOCUMENTS 61-183694 8/1986 Japan.
61-183695 8/1986 Japan.

*Primary Examiner*—William M. Shoop, Jr.
*Assistant Examiner*—Brian Sircus
*Attorney, Agent, or Firm*—Graham & James

[57] ABSTRACT

A method and apparatus for controlling electronic tone generation determines a type of gesture used by a player to contact a performance surface provided with an array of pressure sensors. The performance surface repeatedly is scanned to determine which of the sensors has been activated at each scan time. When a player contacts the performance surface, parameter data associated with the incoming gesture is compared with gesture recognition rules corresponding to various reference gestures. The gesture recognition rules may be preset, and/or the control system may be provided with an optional programming capability which allows the player to establish individualized gesture recognition rules in accordance with reference gestures input by the player. An electronic tone generator is controlled in accordance with the reference gesture which is determined to best fit an incoming gesture. Furthermore, the electronic tone generator may be controlled to generate a tone having a particular tone characteristic determined in accordance with a corresponding parameter of a particular gesture type such that a player may achieve a timbral variation simply by modifying the corresponding parameter of the particular reference gesture.

23 Claims, 6 Drawing Sheets

MEAN SUBROUTINE $$\text{mean } P_i = \frac{\sum_{j=1}^{n} P_{ij}}{n}$$ — S-32

STANDARD DEVIATION SUBROUTINE $$\text{sd } P_i = \sqrt{\frac{\sum_{j=1}^{n} \left( P_{ij} - \text{mean } P_i \right)^2}{(n-1)}}$$ — S-34

METHOD AND APPARATUS FOR CONTROLLING ELECTRONIC TONE GENERATION IN ACCORDANCE WITH A DETECTED TYPE OF PERFORMANCE GESTURE

BACKGROUND OF THE INVENTION

1. Field of the Invention

The present invention relates to a method and apparatus for controlling electronic tone generation in accordance with a type of gesture used to contact a performance surface, and more specifically to a percussion-type tone controller which detects various parameters of a gesture used to contact a performance surface, determines a type of gesture used in accordance with the detected parameters, and controls the generation of a tone based on a determined type of gesture. In general, the present invention relates to the control of tone generation in accordance with a detected type of contact of a striking member with a performance surface. The striking member may be anything which can be used to strike the performance surface (e.g., a hand, stick, or brush). For ease of discussion, reference to a hand is made herein.

Certain percussive musical instruments provide widely varying sounds in response to the manner in which they are played. For example, a conga drum is played by contacting the percussive surface of the instrument with a hand. By changing the type of hand gesture used, a player can achieve a wide variety of tones. For example, the player may slap the drum surface with the full surface of his or her open hand (i.e., full hand slap) to produce a loud, dull sound. Alternatively, the player may tap the drum surface with the tip of a finger (i.e., finger tap) to yield a sharp sound of short duration. Additionally, the player may vary an amount of striking force to achieve variation in timbre. Although striking of a drum surface yields a single drum sound (e.g., conga), the same gesture (e.g., full hand slap) has slightly different tone coloration depending on the intensity of the gesture. For example, a hard full hand slap sounds a different tone than a soft full hand slap. Furthermore, the player may selectively hit a particular area of the drum surface in order to achieve a desired sound. For example, a finger tap made at the center of the drum surface yields a sound having more bass than a finger tap made at the edge of the drum surface. Hence, a player can vary any of a type of hand gesture, an amount of striking force, and a drum surface contact location to achieve a performance rich in expression.

2. Description of the Prior Art

Current percussion-type tone generation systems are provided simply with tone controllers having conventional on/off switches or velocity sensors. These tone controllers control tone generation in accordance with on/off switch operations and a detected velocity, respectively. The tone variation afforded by these types of switches or sensors is limited, and hence a player using these tone controllers is not able to produce a performance rich in expression.

Japanese Patent Application Laid-Open No. Sho. 61-183695 describes an apparatus having a segmented performance surface, each segment being provided with an on/off switch. The apparatus selects a stored waveform from memory in accordance with an operation of an on/off switch by a player. Thus, by contacting a particular area of the performance surface, that is, by operating a particular switch, a player can designate a type of tone to be generated. However, tone variation is limited simply to the tones corresponding to the stored waveforms. Expressive effects associated with different types of gestures are not possible.

Japanese Patent Application Laid-Open No. Sho. 61-183694 describes another apparatus having a segmented performance surface in which each segment is provided with an on/off switch. Two musical waveforms corresponding to musical tones performed at two different points on the performance surface are stored in memory. The apparatus mixes the two waveforms in accordance with the distance between a point at which a player contacts the performance surface (i.e., operates an on/off switch) and the two points, and generates an output musical tone waveform. Tone variation is achieved by changing the point at which the performance surface is contacted, that is, by operating a different on/off switch. Musical tone control in accordance with a recognized type of performance gesture is not possible.

SUMMARY OF THE INVENTION

The present invention is directed to a method and apparatus for controlling electronic tone generation in accordance with a type of gesture used to contact a performance surface. More specifically, the present invention enables a player to control electronic tone generation in a manner similar to a natural percussive musical instrument. In contrast to the prior art which merely generates a tone in accordance with an activated on/off switch or velocity switch, the present invention detects multiple contact points made substantially simultaneously on a performance surface to thereby determine various parameters associated with a gesture, e.g., the area contacted by the gesture and the amount of pressure applied at each contact point, in order to control electronic tone generation. A basic embodiment of the present invention is provided with preset parameter data to identify various standard reference gestures. More individualized tone control can be achieved with a more sophisticated embodiment of the present invention having a programming capability. This embodiment enables a player to establish gesture recognition rules for idiosyncratic gestures of the player and hence to achieve a individualized style of electronic tone control.

The method of the present invention detects a type of gesture used to contact a performance surface by detecting multiple contact points made substantially simultaneously on the performance surface to thereby determine parameters associated with the gesture and comparing the detected parameters to predetermined parameter data corresponding to various types of reference gestures. The parameter data for the reference gestures ma be preset at the factory. Additionally, the reference gesture parameter data may be established in accordance with sample gestures input by a player during a programming operation.

The present invention is provided with an array of sensors responsive to pressure variations, for example, force sensitive resistors. Other examples of sensing devices which may be used are conductive rubber, micromachined strain gauges, and sub-miniature load cells. The sensors are sized and arranged such that different gestures are able to be distinguished based on relatively slight differences between them. For example, a striking by a single finger tip can be distinguished from a striking by a side of a finger or hand. The array of sensors is repeatedly scanned to determine the status of each sensor. Scanning may be performed on a continual basis, or the control system may be configured such that scanning is initiated when contact with the performance surface is detected. When the performance surface is contacted, position coordinates and a pressure value for each activated sensor are detected.

As mentioned previously, the control system may be provided with reference gesture parameter data which has been preset at the factory. However, it is also possible that the control system is equipped with a programming capability which enables a player to input his or her own reference gestures to thereby establish individualized gesture recognition rules and hence create a personalized set of tone control data. In that case, the player selects a program mode and inputs sample reference gestures, and the control system establishes "rules" in accordance with detected parameter data for each of the reference gestures. During a programming operation, a computer repeatedly scans the array of sensors and detects which sensors are activated. Data such as, for example, position and pressure data, are collected for each activated sensor. The data collected at each scan time is referred to hereinafter as a "frame." A predetermined number (which may be adjustable by the player) of frames is referred to hereinafter as a "window." The duration of a window is established such that a gesture is "captured" within a predetermined number of frames. That is, data to identify a type of gesture is collected within one window.

After a window of data has been collected for a gesture, parameter data for the gesture is calculated. This parameter data includes, for example, the maximum and minimum position values (e.g., maximum and minimum x and y positions), the area covered by the gesture, the average position values, the density of active sensors within the area covered by the gesture, the maximum pressure value, and the average pressure value.

During a programming operation, the player repeatedly inputs the same reference gesture (e.g., full hand slap), and a window of data is collected for each inputted gesture. There is no set number of sample gestures required to establish gesture recognition rules. However, a greater number of sample reference gestures enables the establishment of more precise gesture recognition rules. After the player completes the inputting of sample reference gestures, the control system calculates the mean and standard deviation of each gesture parameter and stores this data in memory for the respective gesture. The parameters used to define a particular reference gesture may be selected in accordance with those parameters which most distinguish the gesture. Hence, different parameters may be used to define different reference gestures. For example, the location at which the performance surface is struck affects the tone of a finger tap to a greater degree than the tone of a full hand slap. Hence, this parameter may be used to define a finger tap in order to achieve more sensitive tone control. In contrast, it may be decided that this parameter need not be used to define a full hand slap.

After the control system establishes recognition rules for various different reference gestures in the program mode, a player may use the control system to create a musical performance rich in expression by varying the type and, in some cases, intensity and/or location, of gesture used to contact the performance surface in the play mode. When a player inputs a gesture during the play mode, the control system collects a window of parameter data for the incoming gesture and compares the collected parameter data with the rules stored in memory (either preset at the factory or programmed by the player) for the reference gestures. The control system then determines which reference gesture best fits the incoming gesture and controls a tone to be generated accordingly.

The present invention may be used to control various types of electronic tone generators. For example, one type of tone generator which may be used is a sampling type tone generator in which plural sounds are sampled from the outside and stored in memory. Another type of tone generator which may be used is a frequency modulation tone synthesizer (or "FM tone generator") in which tones are synthesized by employing a frequency modulation operation, with the values of various synthesis parameters determining tone color. The tone generator(s) may be provided externally or may be incorporated with the control system, e.g., in a portable drum-like unit.

When a sampling tone generator (or other stored waveshape type tone generator) is used, each one of various different reference gestures may be assigned a corresponding waveshape stored in the memory of the tone generator. In that case, each time a player uses a particular gesture to contact the performance surface, a tone corresponding to the waveshape of the reference gesture which best fits the gesture of the player is generated. That is, a particular stored sound is designated by an assigned gesture. For example, the tones of a natural conga drum for each of various different reference gestures (e.g., thumb tap, finger tap, full hand slap, hollow hand slap, and heel of hand slap) may be sampled by the sample tone generator, and the corresponding tone assigned to the particular reference gesture. Then, when a player contacts the performance surface with a gesture, electronic tone generation is controlled in accordance with the one of the five reference hand gestures which best fits the gesture of the player. Furthermore, it is possible to assign some of the parameter data to modify other aspects of the electronic tone generation. For example, if the sound corresponding to the reference gesture called "full hand slap" is selected to be played by the tone-generator, then the maximum-pressure value can be used to control the amplitude of the sound playback, and the average x and y position data can be used to control the pitch of the sound by varying the sample rate use when playing back the sound from the tone-generator.

Another type of tone generator which may be controlled is a frequency modulation tone synthesizer (or "FM tone generator"). In this case, various tone parameters may be modified in accordance with a type of gesture used by a player to contact the performance surface.

BRIEF DESCRIPTION OF THE DRAWINGS

The invention will be described with reference to the accompanying drawings, wherein.

DESCRIPTION OF THE PREFERRED EMBODIMENT

The following is a description of the best presently contemplated mode of carrying out the present invention. The description illustrates the general principles of the invention and is not to be viewed in a limiting sense. In particular, although the invention is described with reference to a hand gesture, the invention may =used in accordance with other types of gestures. The scope of the invention is best determined by reference to the accompanying claims.

Figure 1:
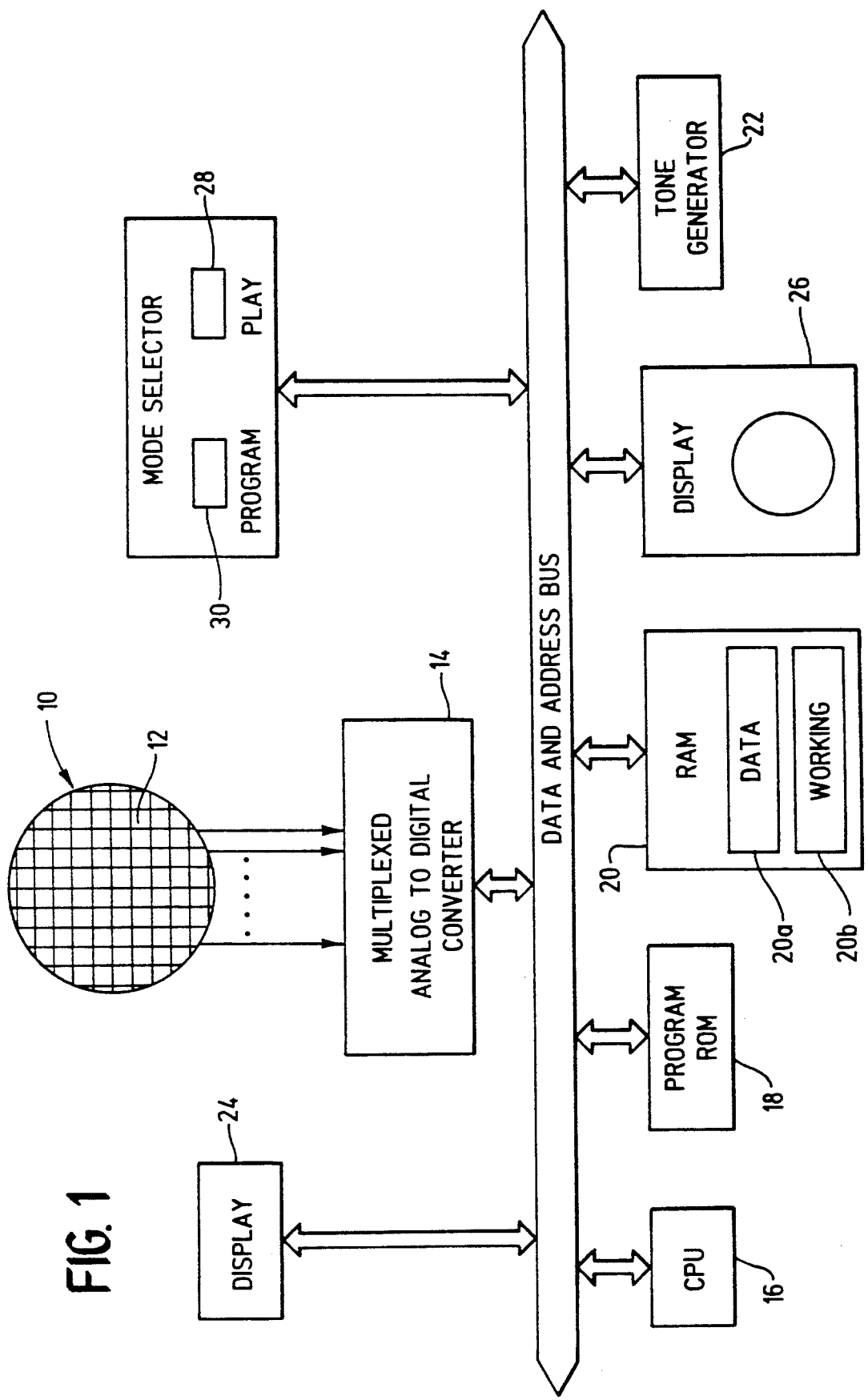
FIG. 1 is a block diagram of the gesture-based tone generation system of the present invention.

FIG. 1 is a block diagram of the gesture-based tone generation system of the present invention. As shown in FIG. 1, the performance surface 10 comprises an array of pressure sensors 12 situated on a drum-like surface made of, for example, plastic or rubber, so as to be smooth and flexible, and to provide a drum-like "feel" and "bounce" which helps to prevent hand fatigue. However, the underlying surface may be made of metal or another material. The sensors 12 preferably are, for example, force sensitive resistors (available from Interlink Electronics) arranged in a rectilinear manner. A force sensitive resistor comprises a relatively thin piece of plastic provided with resistive ink. The electrical resistance of the resistive ink varies in direct proportion to the amount of force applied to the surface of the plastic. Alternatively, other types of sensors may be used, e.g., conductive rubber, micromachined strain gauges, or sub-miniature load cells. Additionally, rather than the particular configuration shown in FIG. 1, the sensors 12 may be arranged in other geometries. For example, the sensors 12 may be arranged in an offset manner, so as to form a hexagonal array. Furthermore, the sensors 12 may be circular, triangular, or any other shape. It should be apparent from the above discussion that the performance surface 10 may be configured and constructed in any manner which enables the collection of data sufficient to calculate various parameters associated with a contact gesture (i.e. with sufficient sensor density and minimal "dead-zones" where there are no sensors).

The performance surface 10 is connected to a multiplexed analog-to-digital converter 14 such that the output signals of activated sensors 12 are transmitted to the analog-to-digital converter 14 on a time-division basis. A microcomputer section includes a central processing unit (CPU) 16, a program read only memory (ROM) 18, and a random access memory (RAM) 20 including a data RAM area 20a and a working RAM area 20b. The performance surface 10 receives gestures from a player to control a tone generator 22. The primary means of communication between the control system and the tone-generator 22 is via the industry standard Musical Instrument Digital Interface (MIDI). An alpha-numeric LCD display 24 gives instructions and feedback to the user during program and play modes. The display 24 allows the user to save and load gestures and to assign gestures and parameters to different tone-generator controls. A display 26 shows which sensors 12 are activated by a gesture. For example, the display 26 may comprise an array of light emitting diodes (LEDs) corresponding to the sensor 12 array, each of which illuminates when a corresponding sensor 12 is activated.

In a basic embodiment, the data RAM 20a is provided with preset parameter data for a number of different reference gestures. For example, parameter data for a thumb tap, finger tap, hand slap, hollow hand slap, and heel of a hand slap may be preset at the factory. Hence, when a player contacts the performance surface 10, the control system detects a type of gesture used by the player and determines which of a thumb tap, finger tap, hand slap, hollow hand slap, and heel of hand slap most closely corresponds to the input gesture. A tone generator 22 may then be controlled in accordance with the reference gesture determined to best fit the input gesture. A sampling type tone generator may be provided as the tone generator 22, either externally or integrated with the control system, such that the sounds associated with a thumb tap, finger tap, hand slap, hollow hand slap, and heel of hand slap of a natural percussion instrument may be generated when the corresponding gesture is determined to have been used.

Figure 2:
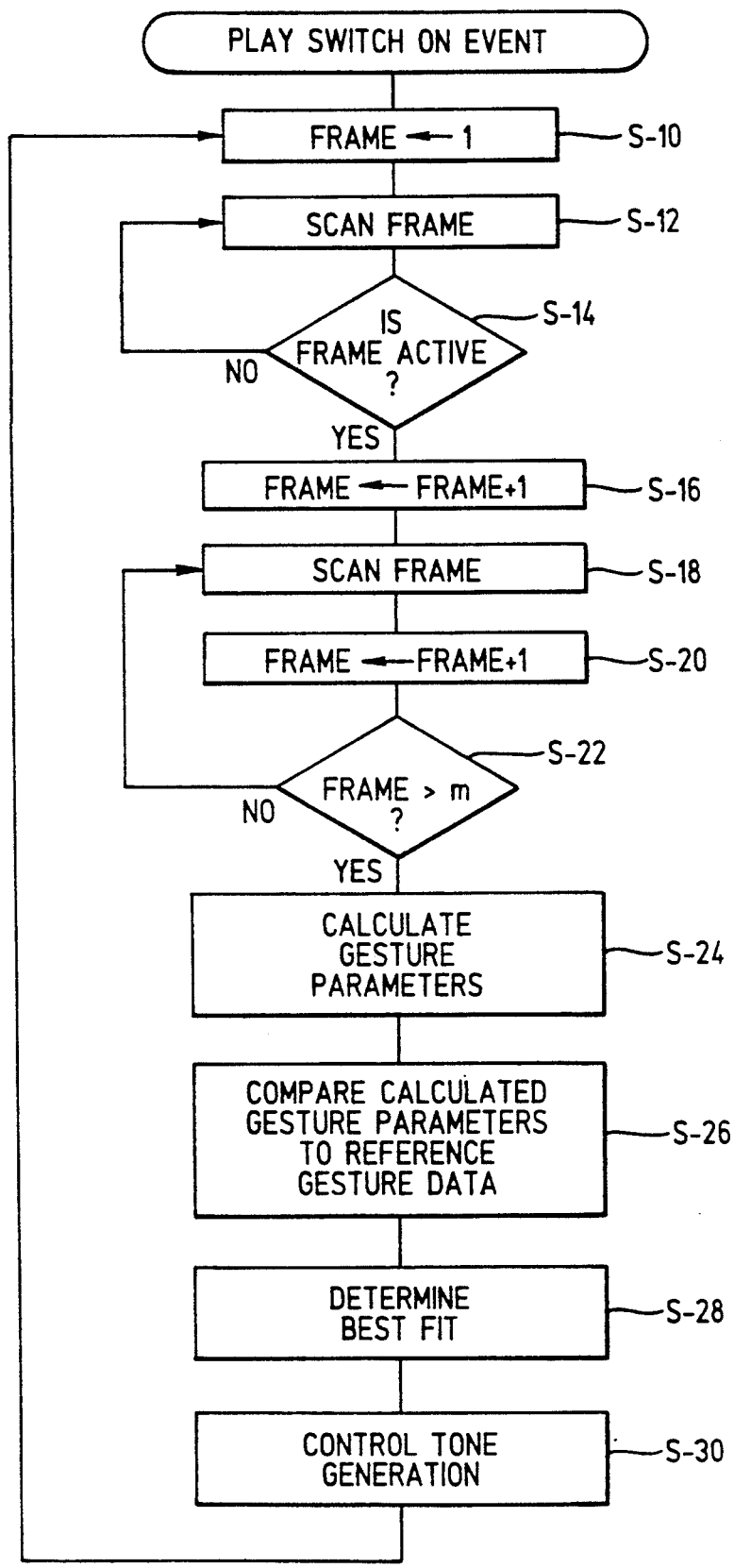
FIG. 2 shows the steps of a play operation.

FIG. 2 illustrates the steps of a play switch 28 on-event. When the play switch 28 is turned on, the frame count is initialized to 1 (S-10), and the CPU 16 scans a frame (S-12), the frame comprising an array of N sensors 12. During the scanning of a frame, each sensor 12 is scanned, and position data (x, y coordinates) and a pressure value (p) for each activated sensor is collected.

If it is detected that there are any active sensors in this first frame (i.e., if any of the pressure values within the frame exceed a threshold "no-load" value) (S-14), then the frame count is incremented (S-16), and a window of data is scanned. Otherwise, another "first" frame of data is scanned (S-12) until the first frame with active sensors (i.e., an "active" frame) is detected.

After the first active frame is scanned, the frame count is incremented by 1 (S-16) as mentioned above, and another frame is scanned (S-18). The frame count is incremented by 1 (S-20), and it is determined whether or not a window of data has been collected (S-22) (i.e., whether or not a number of frames constituting a window has been scanned). It has been found that a window should comprise at least 10 frames for optimum performance. Additionally, it has been found that a typical gesture time is approximately 3.5 milliseconds. Hence, a window of data should be captured within approximately 3.5 milliseconds. If a number of frames less than or equal to the number of frames set to constitute a window (m) have been scanned, a frame is scanned again (S-18), and then the frame count is increased by 1 (S-20 as described previously.

If the number of frames which has been scanned is greater than m, (i.e., a window of data has been collected), then various parameter data are determined from the collected frame data. Some examples of gesture parameters which may be measured for a particular type of gesture are:

| | |
|---|---|
| maximum x value | $WX_{max}$ |
| maximum y value | $WY_{max}$ |
| minimum x value | $WX_{min}$ |
| minimum y value | $WY_{min}$ |
| x distribution | $WX_{dist} = (WY_{max} - WY_{min}) + 1$ |
| y distribtuion | $WY_{dist} = (WY_{max} - WY_{min}) + 1$ |
| Feret area of active sensors | $W_{area} = WX_{dist} * WY_{dist}$ |
| average x value | $WX_{avg}$ |
| average y value | $WY_{avg}$ |
| distribution ratio | $WXY_{ratio} = WX_{dist}/WY_{dist}$ |
| distance of point $WX_{avg}$, $WY_{avg}$ to center | |

-continued $$W_{radius} = \sqrt{(WX_{avg} - \text{Center } X)^2 + (WY_{avg} - \text{Center } Y)^2}$$

| | |
|---|---|
| total number of active sensors | Wactive |
| density of active sensors within WArea | Wdensity = WActive/WArea |
| maximum pressure value | $WP_{max}$ |
| average pressure value | $WP_{avg}$ |

A variety of other parameters may be calculated for each window, for example, form factor or x and y values weighted by pressure. However, the parameters set forth above are sufficient to recognize several types of gestures.

Some gestures are "position-dependent", i.e., the location at which the gesture contacts the performance surface substantially affects the sound generated. In that case, the reference gesture definition includes some position information. For example, a Center Finger Tap, i.e., a finger tap near the center of the performance surface, may have average X and Y values near the center of the performance surface, while a Side Finger Tap, i.e., a finger tap near the side of the performance surface, may have average X and Y values near the side of the performance surface. In contrast, some gestures are "position-independent", in which case position information is not used in gesture definition, but may be used to further modify the associated sound by varying some tone generator parameters (such as pitch, filter frequencies, harmonic content, or the like).

Once a window of data has been collected, gesture parameters such as those listed above are calculated (S-24). The calculated gesture parameters are compared to the reference gesture parameter data stored in the data RAM 20a (S-26), and a best fit (i.e., which reference gesture corresponds most closely to the inputted gesture) is determined (S-28). An electronic tone generator 22 is then controlled in accordance with the reference gesture determined to best fit the input gesture (S-30).

In the preferred embodiment, a mean and standard deviation for each reference gesture parameter is stored in memory. When a player inputs a gesture during the play mode, a "best fit" is determined by comparing each measured parameter of the incoming gesture to the parameter data stored in memory. For an incoming gesture, k parameters represented by Pi where i equals 1 to k are measured. The mean and standard deviation are calculated in accordance with the subroutines shown in FIGS. 3 and 4, respectively. More specifically, the mean is calculated as follows (S-32):

$$\text{mean } Pi = \frac{\sum_{j=1}^{n} P_{ij}}{n}$$

and the standard deviation (S-34):

$$\text{standard deviation } Pi = \sqrt{\frac{\sum_{j=1}^{n} (P_{ij} - \text{mean } Pi)^2}{n-1}}$$

The incoming value of each parameter is normalized in terms of the standard deviation of each of the reference gestures stored in memory. For example, for parameter Pi, the normalized error term $E_i$, is given by:

$$E_i = \frac{|Pi - \text{mean } Pi|}{sd\ Pi}$$

where

Pi is the measured parameter of the incoming gesture,
mean Pi is the mean value for parameter Pi for a particular reference gesture, and
sd Pi is the standard deviation for parameter Pi for a particular reference gesture.

Each normalized error term represents the distance of the sampled data from the mean in units of standard deviation. The normalized error term for each gesture parameter is summed to obtain an overall error term for each reference gesture:

$$E = \sum_{i=1}^{K} \frac{|Pi - \text{mean } Pi|}{sd\ Pi}$$

where

Pi is the measured parameter of the incoming gesture,
mean Pi is the mean value for parameter Pi for a particular reference gesture, and
sd Pi is the standard deviation for parameter Pi for a particular reference gesture.

Alternatively, the formula for variance may be used instead of the formula for standard deviation. The variance is calculated as follows:

$$\text{Variance } Pi = \frac{\sum_{j=1}^{n} (P_{ij} - \text{mean } Pi)^2}{n-1}$$

The normalized error term $E_i$ is calculated as follows:

$$E_i = \frac{(Pi - \text{mean } Pi)^2}{\text{Variance } Pi}$$

Figure 5:
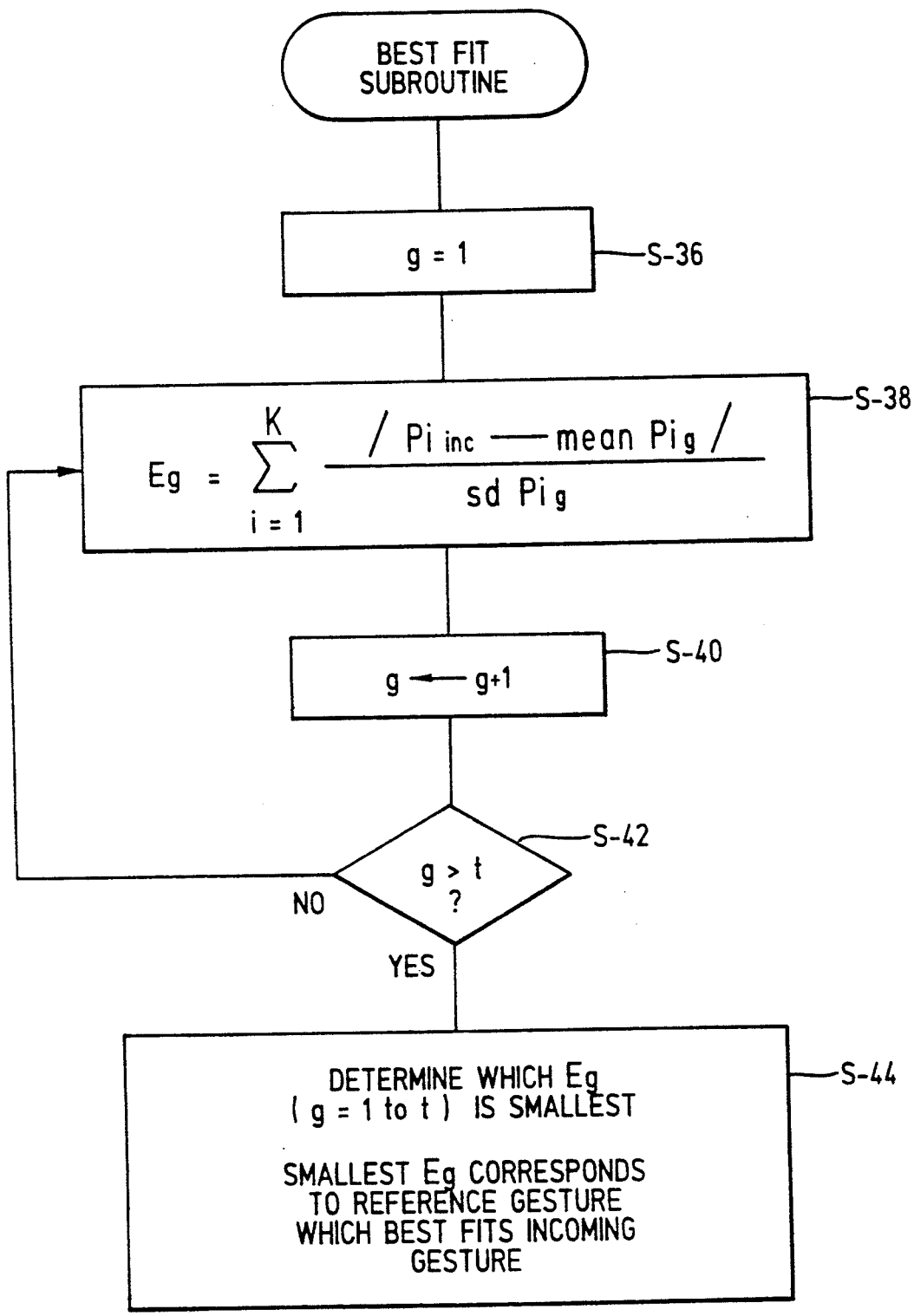
FIG. 5 shows a best fit calculation subroutine.

FIG. 5 shows a best fit determination subroutine. A gesture count is initialized to 1 (S-36) and an overall error term for gesture 1 is calculated (S-38). The gesture count is incremented by 1 (S-40), and if an overall error term has not been calculated for all t of the reference gestures (S-42), an overall error term is calculated for a next reference gesture. When overall error terms for all t of the reference gestures has been calculated, the computer determines which reference gesture has the smallest overall error term (S-44). The overall error term which is the smallest corresponds with the reference gesture which best fits the incoming gesture. An example is given below. For simplicity, only two gesture parameters are considered.

| Parameter | Thumb Tap | Finger Tap | Hand Slap | Hollow Hand Slap | Heel of Hand Slap |
|---|---|---|---|---|---|
| ratio x/y | | | | | |
| Mean | 0.3 | 1.1 | 0.8 | 0.6 | 2.3 |
| Standard Deviation | 0.3 | 0.5 | 0.2 | 0.2 | 0.3 |
| # active sensors | | | | | |
| Mean | 16.7 | 14.3 | 32.8 | 24.5 | 20.7 |
| Standard Deviation | 2.8 | 2.3 | 8.5 | 7.6 | 5.4 |

An incoming gesture is sampled, and the following data is collected:

ratio x/y = 1.7 active sensors = 18.9

The overall error term for each reference gesture is as follows:

$$E_{thumb\ tap} = \frac{|1.7 - 0.3|}{0.3} + \frac{|18.9 - 16.7|}{2.8} = 5.45$$

$$E_{finger\ tap} = \frac{|1.7 - 1.1|}{0.5} + \frac{|18.9 - 14.3|}{2.3} = 3.20$$

$$E_{hand\ slap} = \frac{|1.7 - 0.8|}{0.2} + \frac{|18.9 - 32.8|}{8.5} = 5.13$$

$$E_{hollow\ hand\ slap} = \frac{|1.7 - 0.6|}{0.2} + \frac{|18.9 - 24.5|}{7.6} = 6.23$$

$$E_{heel\ of\ hand\ slap} = \frac{|1.7 - 2.3|}{0.3} + \frac{|18.9 - 20.7|}{5.4} = 2.33$$

With respect to the five reference gestures, the error term for the heel of hand slap is smallest. Hence, the heel of hand slap best fits the incoming gesture. That is, the heel of hand slap most closely corresponds to the incoming gesture as compared to any of the other reference gestures. As a result, the control system would control tone generation in accordance with a heel of hand slap.

Figure 6:
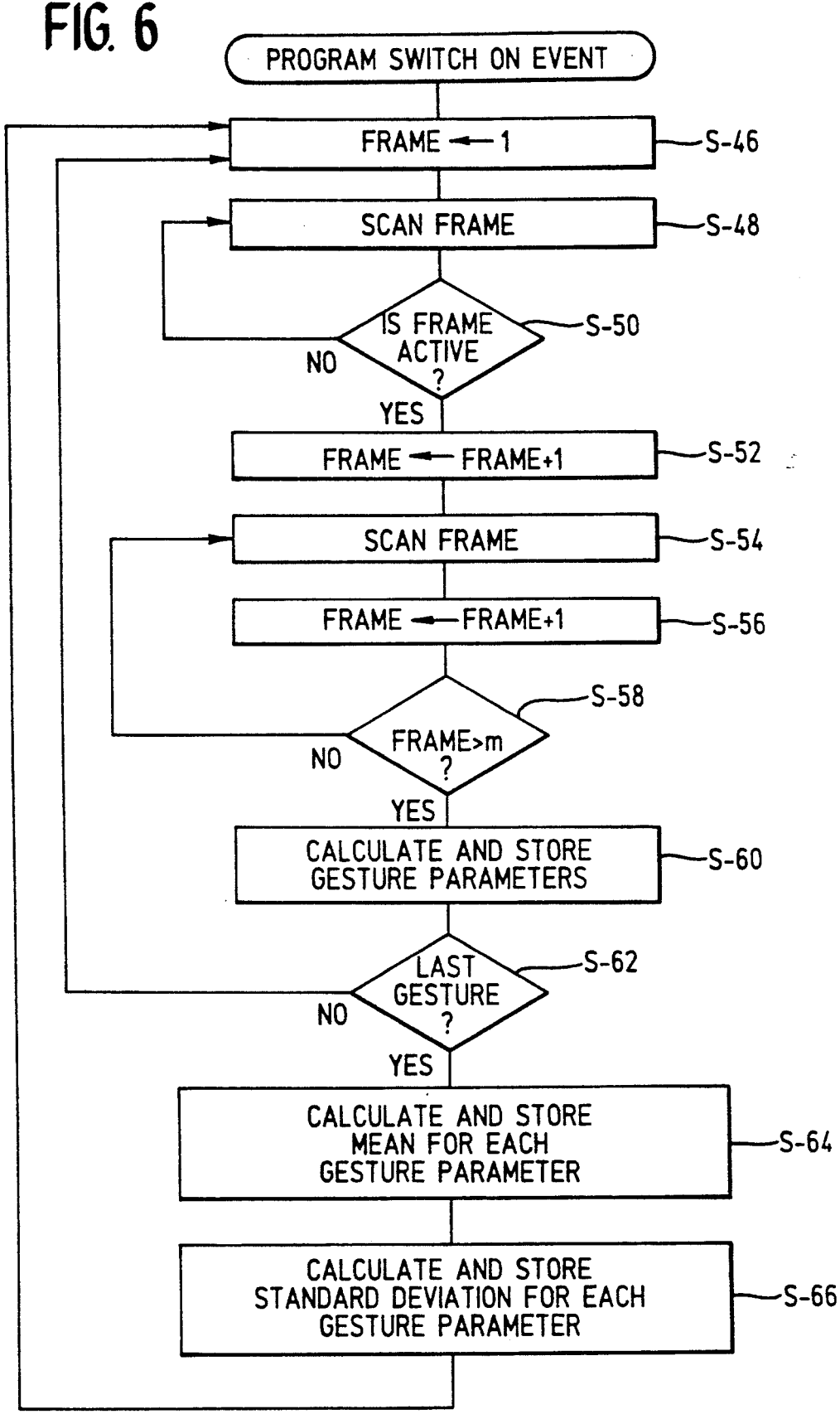
FIG. 6 shows the steps of a programming operation.

A more sophisticated embodiment of the present invention enables a player to personally program reference gesture parameter data, in addition to the option to select preset factory data. In that case, the control system is provided with a program switch 30 which enables a player to designate a program mode. FIG. 6 shows the steps of a programming operation. When the program switch 30 is operation, the control system initializes a frame count to 1 (S-46) and then scans a frame (S-48) in a manner similar to that discussed previously with respect to the play mode. It is then detected whether the first frame is active (S-50). After a first active frame is collected, the frame count is then increased by 1 (S-52), and further frames are scanned (S-54) and the frame count is respectively incremented (S-56). It is then determined whether or not a number of frames equal to a window (m) has been scanned (S-58). If a number of frames less than or equal to the number of frames set to constitute a window (m) have been scanned again, a frame is scanned again (S-54), and then the frame count is increased by 1 (S-56). Once a window of data has been collected, gesture parameters such as those discussed previously in connection with the play mode are calculated and stored for later use by the mean and standard deviation subroutines (S-60).

Figure 3:
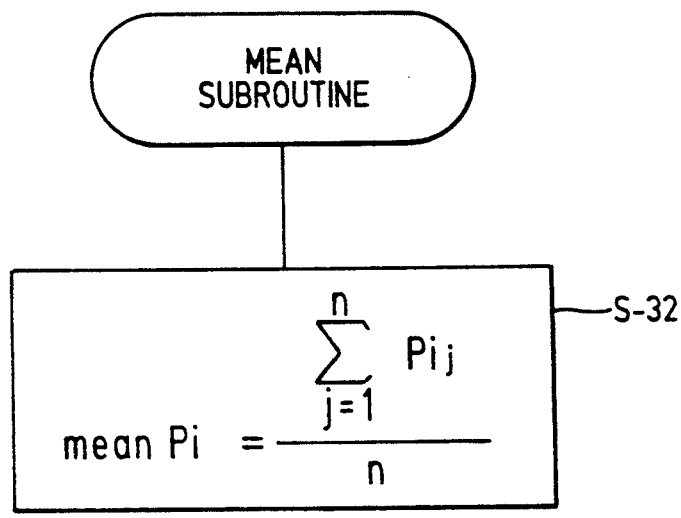
FIG. 3 shows a mean calculation subroutine.
Figure 4:
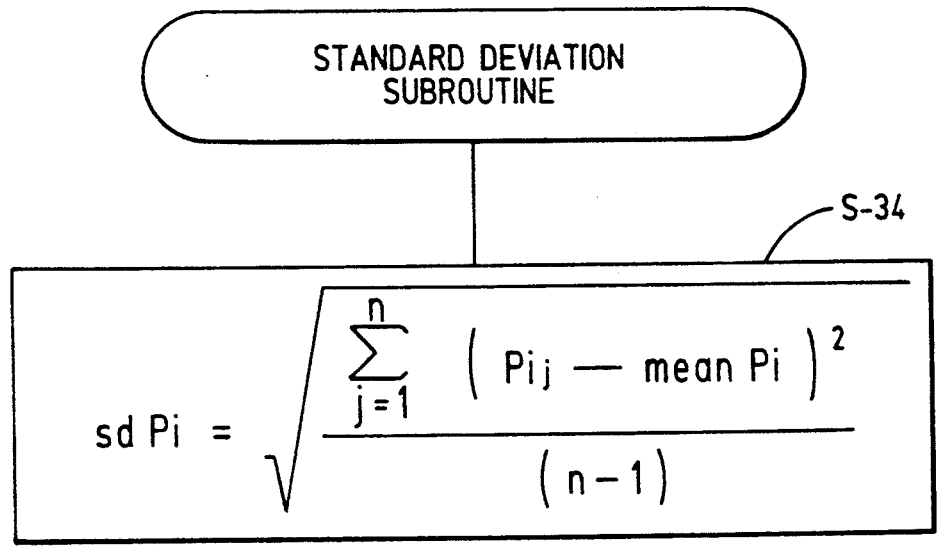
FIG. 4 shows a standard deviation calculation subroutine.

During the program mode, the player inputs the same gesture several times, and a window of data is collected for each inputted gesture. For example, a player may input a full hand slap fifty times. In that case, fifty windows of data are collected. There is no exact number of sample gestures required to be inputted to establish parameter data for a particular type of reference gesture. However, the greater the number of sample gestures inputted, the more precisely parameter data is established for a particular reference gesture. When the player indicates that he or she has completed inputting sample gestures for a particular reference gesture (S-62), the control system calculates and stores in the working RAM 20b the mean (S-64) and standard deviation (S-66) for each gesture parameter. FIGS. 3 and 4 show subroutines for the mean and standard deviation calculations, respectively.

For ease of understanding, the embodiments of the present invention have been described above with reference to a relatively simple scheme of tone control. However, tone variation may be achieved in an infinite number of ways. For example, plural tones may be assigned to a particular reference gesture in accordance with intensity (as measured by average or maximum sensor pressure). That is, tone data corresponding to hard, medium, and soft contacts may be provided for a single gesture. In that case, for example, a hard hand slap on a performance surface 10 assigned a tone color of a conga would result in a conga tone having different coloration than a medium hand slap or a soft hand slap. Likewise, a medium hand slap and a soft hand slap would sound a conga tone having a different tone coloration than a hard hand slap or a soft hand slap and a hard hand slap or a medium hand slap, respectively. Also, as described previously, different individual parameters may be used to control other real-time tone-generator controls (such as pitch, modulation, harmonic content, amplitude and the like).

Figure 7A:
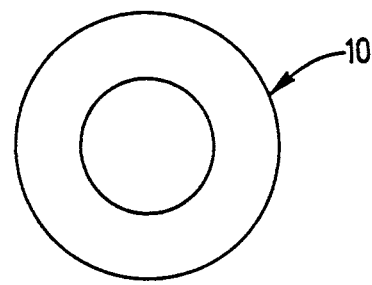
FIGS. 7A-7B show examples of a performance surface divided into sections.
Figure 7B:
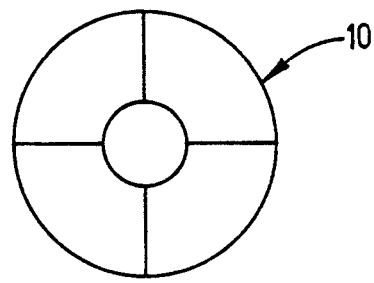

Furthermore, the performance surface 10 may be divided into plural sections, each assigned a particular tone color. For example, the performance surface 10 may be divided into two concentric circular sections as shown in FIG. 7A, or into a circular center section and four adjacent outer sections as shown in FIG. 7B. In the case in which the performance surface 10 is divided into two concentric circles, the center section may be assigned tone data corresponding to the center of a natural percussion instrument, and the outer section may be assigned tone data corresponding to the edge of a natural percussion instrument. This configuration is especially useful in the case of a natural musical instrument having substantially different tone characteristics at its center and its edge, e.g., a snare drum.

Various types of tone control may be executed when two or more sections of the divided performance surface 10 are detected to have been contacted, e.g., when a gesture overlaps multiple sections of the performance surface 10. For example, a tone may be generated in accordance with the tone color corresponding to the section detected to have the most applied pressure. Alternatively, plural tones each having a tone color corresponding to a contacted section may be generated, each tone having a volume proportional to the intensity of the striking in the corresponding section. Furthermore, tone color can be modified by a process of interpolating between the plural tone data descriptions (for example, the tone data corresponding to the two concentric circular sections). This interpolation process can be handled by the tone generator by either simple audio cross-fading or by tone generator parameter interpolation. In this case, a continuous change in tone color is heard as a particular gesture is made starting at the edge of the surface and moving toward the center of the surface.

As mentioned previously, the control system may be used to control any type of electronic tone generator 22, and the tone generator 22 may be provided externally or incorporated with the control system. Tone generators which are provided externally will be controlled primarily via the industry standard Musical Instrument Digital Interface (MIDI) protocol. For example, the tone generator 22 may be an FM tone generator or a sampling type tone generator. The FM tone generator modifies various tone control parameters (e.g., ratio of carrier and modulating waves, modulation index, pitch, or envelope) in accordance with the detected gesture to produce an appropriate tone. The sampling type tone generator sounds a sample tone (i.e., a stored waveshape obtained from sampling an external sound) in accordance with an assigned gesture.

Preferred embodiments of the present invention have been described above. It is understood that one may make various modifications to the disclosed embodiments without departing from the spirit and scope of the invention. For example, many types of sensors other than force sensitive resistors may be used. Any type of sensor which enables the collection of parameter data sufficient to identify various gesture types may be used. Additionally, the parameters which are measured to identify gestures are not limited to those set forth in the specification. Also, various other analytic methods may be used to identify gestures, e.g., expert systems, neural networks, or fuzzy logic. Furthermore, the performance surface may be configured in a variety of manners. Hence, the present invention is not limited to the preferred embodiments described herein, but may be altered in a variety of ways which would be apparent to a person of ordinary skill in the art.

I claim:

1. A method of controlling an electronic tone generator in accordance with a type of gesture used by a player to contact a performance surface, comprising the steps of:
   providing a performance surface including an array of pressure sensors, each of which provides an output;
   analyzing the output from each sensor of the array to determine a pattern of plural sensors which have been substantially simultaneously activated by a player, said pattern corresponding to a type of gesture used by a player to contact the performance surface; and
   controlling an electronic tone generator in accordance with a type of gesture determined to have been used by the player to contact the performance surface.

2. The method of claim 1, wherein the performance surface is a drum-like surface.

3. The method of claim 1, wherein the electronic tone generator controlled is a sampling type tone generator comprising a memory storing various waveshapes corresponding to various tones, and wherein one of said waveshapes is selected based on the type of gesture determined to have been used, and the tone generator is controlled to generate a tone in accordance with the selected waveshape.

4. The method of claim 1, wherein the tone generator is a tone synthesizer which controls at least one of pitch and envelope in accordance with a detected gesture.

5. The method of claim 1, wherein the electronic tone generator is controlled to generate a tone having at least one tone characteristic which is determined in accordance with at least one corresponding parameter of a particular gesture type when the particular gesture type is determined to have been used by the player, whereby the player may achieve a timbral variation simply by modifying the corresponding parameter of the particular gesture type.

6. The method of claim 5, wherein the tone characteristic is one of volume, pitch, modulation, and harmonic content.

7. The method of claim 5, wherein the parameter is one of average pressure value for the particular gesture type and distance from the center of the performance surface to the center of the gesture.

8. A method of controlling an electronic tone generator in accordance with a type of gesture used by a player to contact a pressure sensitive surface, comprising the steps of:
   providing a pressure sensitive surface including an array of pressure sensors to detect a type of gesture used by a player to contact the performance surface, the array of pressure sensors respectively detecting pressures applied thereto;
   detecting the substantially simultaneous activation of plural ones of the pressure sensors to which at least a threshold amount of pressure is applied when a player contacts the surface;
   determining a type of gesture used by a player to contact the surface in accordance with the detected activation of said plural pressure sensors; and
   controlling an electronic tone generator in accordance with a type of gesture determined to have been used by the player to contact the surface.

9. A method of controlling an electronic tone generator in accordance with a type of gesture used by a player to contact a performance surface, comprising the steps of:
   providing a performance surface comprising an array of pressure sensors, each of which generates an output signal when activated;
   detecting the output of each sensor of the array of sensors;
   determining a type of gesture used by the player to contact the array in accordance with the detected output of plural sensors substantially simultaneously activated by a players; and
   controlling an electronic tone generator in accordance with a type of gesture determined to have been used by the player to contact the array.

10. A method of controlling an electronic tone generator in accordance with a type of gesture used by a player to contact a performance surface, comprising the steps of:
   providing a performance surface comprising an array of pressure sensors, each of which generates an output signal representative of an amount of pressure applied by the player;
   detecting a position of each sensor based upon the sensor output;
   detecting an amount of pressures applied to each sensor based upon the sensor output;
   determining a pressure pattern of plural activated sensors corresponding to the type of gesture used by a player to contact the array in accordance with the detected position and the detected amount of pressure for each sensor output; and
   controlling an electronic tone generator in accordance with a type of gesture determined to have been used by the player to contact the array.

11. A method of controlling an electronic tone generator in accordance with a type of gesture used by a player to contact a performance surface, comprising the steps of:

provding a performance surface comprising an array of pressure sensors, each of which generates an output signal representative of an amount of applied pressure when activated;

programming parameter data for reference gestures;

storing the parameter data in memory;

detecting a pattern of activated sensors when a player contacts the array;

comparing a detected pattern of activated sensors with the parameter data stored in memory;

determining a best fit of the detected pattern with the parameter data stored in memory; and controlling an electronic tone generator in accordance with a determined best fit.

12. A control system for controlling an electronic tone generator in accordance with a type of gesture used by a player to contact a performance surface, the control system comprising:

a performance surface comprising an array of pressure sensors, each generating an output signal representative of an amount of applied pressure when activated;

detecting means for detecting a pattern of sensor output;

a memory capable of storing parameter data for various reference gestures;

comparing means for comparing a detected pattern of sensor output with parameter data stored in the memory;

determining means for determining a best fit of the detected pattern with the parameter data stored in the memory; and control means for controlling an electronic tone generator in accordance with a determined best fit.

13. A control system for controlling an electronic tone generator in accordance with a type of gesture used by a player to contact a pressure sensitive surface, the control system comprising:

a pressure sensitive surface comprising an array of sensors, each of which provides an output;

detecting means for detecting a surface contact pattern from the sensor output, the surface contact pattern comprising the part of the surface to which at least a threshold amount of pressure is applied;

a memory capable of storing parameter data representative of plural types of reference surface contact patterns;

comparing means for comparing a detected surface contact pattern associated with an incoming gesture with the parameter data stored in the memory, an incoming gesture being a gesture presently contacting the pressure sensitive surface;

determining means for determining which of the reference surface contact patterns best fits the detected surface contact pattern; and control means for controlling an electronic tone generator in accordance with a determined best fit.

14. The control system of claim 13, wherein the control means controls the electronic tone generator to generate a tone having at least one tone characteristic determined in accordance with at least one corresponding parameter of a particular gesture type when the particular gesture type is determined to have been used by the player, whereby the player may achieve a timbral variation simply by modifying the corresponding parameter of the particular gesture type.

15. The control system of claim 14, wherein the tone characteristic is one of volume, pitch, modulation, and harmonic content.

16. The control system of claim 14, wherein the parameter is one of average pressure value for the particular gesture type and distance from the center of the performance surface to the center of the gesture.

17. A control system for controlling an electronic tone generator in accordance with a type of gesture used by a player to contact a performance surface, the control system comprising:

a performance surface comprising an array of pressure sensors, each of which generates an output signal when activated; and a computer comprising a memory storing preset data for various reference gestures, wherein the computer scans the array, each scan of the array constituting a frame, and within each frame detects for each sensor whether or not the sensor has been activated, wherein data is collected for each frame and plural frames of data are collected for each incoming gesture;

wherein the computer compares data collected within frames associated with an incoming gesture with parameter data stored in the memory and determines which one of the reference gestures corresponds most closely to the incoming gesture and outputs a control signal corresponding to the reference gesture providing the best fit;

wherein the control signal may be used to control an electronic tone generator.

18. A control system as in claim 17, further comprising a display which shows which of said sensors are activated by a gesture.

19. A control system as in claim 18, wherein said display comprises an array of light emitting diodes, each diode corresponding to a particular sensor, and each diode illuminating when the corresponding sensor is activated by a gesture.

20. The control system of claim 17, wherein the performance surface is circular and is divided into at least first and second concentric circular sections, the first circular section being situated at the center of the performance surface and the second circular section being situated at the edge of the performance surface, wherein the computer stores tone data in memory corresponding to the center portion of a natural musical instrument for the first circular section and tone data corresponding to the edge portion of a natural musical instrument for the second circular section.

21. A control system for controlling an electronic tone generator in accordance with a type of gesture used by a player to contact a performance surface, the control system comprising:

a performance surface comprising an array of sensors, each of which generates an output signal when activated;

a selector by which a player may select at least one of a program mode and a play mode, wherein in the program mode the control system establishes parameter data for reference gestures input by a player and in the play mode the control system determines which one of the reference gestures most closely corresponds to an incoming gesture, an incoming gesture being a gesture presently contacting the performance surface;

a computer which scans the array, each scan of the array constituting a frame, and within each frame detects for each sensor whether or not the sensor has been activated, wherein data is collected for each frame and plural frames of data are collected for each incoming gesture in both of the program and play modes, and further wherein a predetermined number of frames defines a window and data for an incoming gesture is captured within a corresponding window;

wherein the computer comprises a memory for storing collected data, and in the program mode, the computer establishes parameter data for each type of reference gesture in accordance with windows of data collected for the reference gesture, and in the play mode, the computer compares data collected within a window associated with an incoming gesture with parameter data established for the reference gestures and determines which one of the reference gestures corresponds most closely to the incoming gesture and outputs a control signal corresponding to the reference gesture providing the best fit;

wherein the control signal may be used to control an electronic tone generator.

22. A control system according to claim 21, wherein the sensors are arranged such that each sensor has a corresponding position represented by coordinates x,y and wherein the frame data collected by the computer comprises coordinates x,y associated with each activated sensor and an amount of pressure applied to each activated sensor.

23. A control system according to claim 21, wherein the computer calculates k parameters Pi (i=1 to k) for an incoming gesture in accordance with collected frame data and calculates the means for each parameter for each reference gesture in accordance with the equation:

$$\text{mean } Pi = \frac{\sum_{j=1}^{n} P_{ij}}{n}$$

and the standard deviation for each parameter in accordance with the equation:

$$\text{standard deviation } Pi = \sqrt{\frac{\sum_{j=1}^{n}(P_{ij} - \text{mean } Pi)^2}{n-1}}$$

and wherein the computing means determines which of the reference gestures best fits the incoming gesture by calculating the overall error term for each reference gesture in accordance with the equation:

$$E_g = \sum_{i=1}^{K} \frac{|Pi_{inc} - \text{mean } Pi_g|}{sd\ Pi_g}$$

where
$E_g$ = overall error term for a reference g
$Pi_{inc}$ = ith parameter of an incoming gesture
mean $Pi_g$ = mean of the ith parameter of the reference gesture g
sd $Pi_g$ = standard deviation of the ith parameter of the reference gesture g;
wherein the lowest overall error term corresponds to the reference gesture which best fits the incoming gesture.

* * * * *